United States Patent [19]

Gugenhan

[11] 3,990,606
[45] Nov. 9, 1976

[54] SINGLE SEED DRILLING MACHINE
[75] Inventor: Heinrich Gugenhan, Duren, Germany
[73] Assignee: H. Fähse & Co., Duren, Germany
[22] Filed: Dec. 10, 1974
[21] Appl. No.: 531,288

Related U.S. Application Data
[63] Continuation of Ser. No. 385,423, Aug. 28, 1973, abandoned.

[30] Foreign Application Priority Data
Aug. 28, 1972 Germany............................ 2242272

[52] U.S. Cl................................. 221/211; 111/78
[51] Int. Cl.²........................................... B65H 3/14
[58] Field of Search ............. 221/211, 278; 111/77, 111/78; 209/86, 94, 111.6

[56] References Cited
UNITED STATES PATENTS

| | | | |
|---|---|---|---|
| 2,505,758 | 5/1950 | Enebeck | 221/211 X |
| 2,991,909 | 7/1961 | Lamazou et al. | 221/211 |
| 3,142,274 | 7/1964 | Winter | 221/211 X |
| 3,209,888 | 10/1965 | Sterling | 221/211 X |

FOREIGN PATENTS OR APPLICATIONS

| | | | |
|---|---|---|---|
| 1,410,390 | 8/1965 | France | 221/211 |
| 802,899 | 10/1958 | United Kingdom | 221/211 |

Primary Examiner—Robert B. Reeves
Assistant Examiner—Joseph J. Rolla
Attorney, Agent, or Firm—Finnegan, Henderson, Farabow and Garrett

[57] ABSTRACT

A single seed drilling machine has a rotatable drum the interior of which is connected in use to a source of reduced pressure. The drum is closed by a plate which has a circle of suction holes, so that seed can be held at the holes against the outer surface of the plate. Within the drum an interrupter device engages the plate to close a hole in the lowest region of the plate. Adjacent that hole, outside the plate, is a seed ejector device. Thus in the lowest region of the rotatable plate, the suction holding seed at a hole is temporarily rendered ineffective, at which time the seed is directed away from the plate by the ejector device.

12 Claims, 8 Drawing Figures

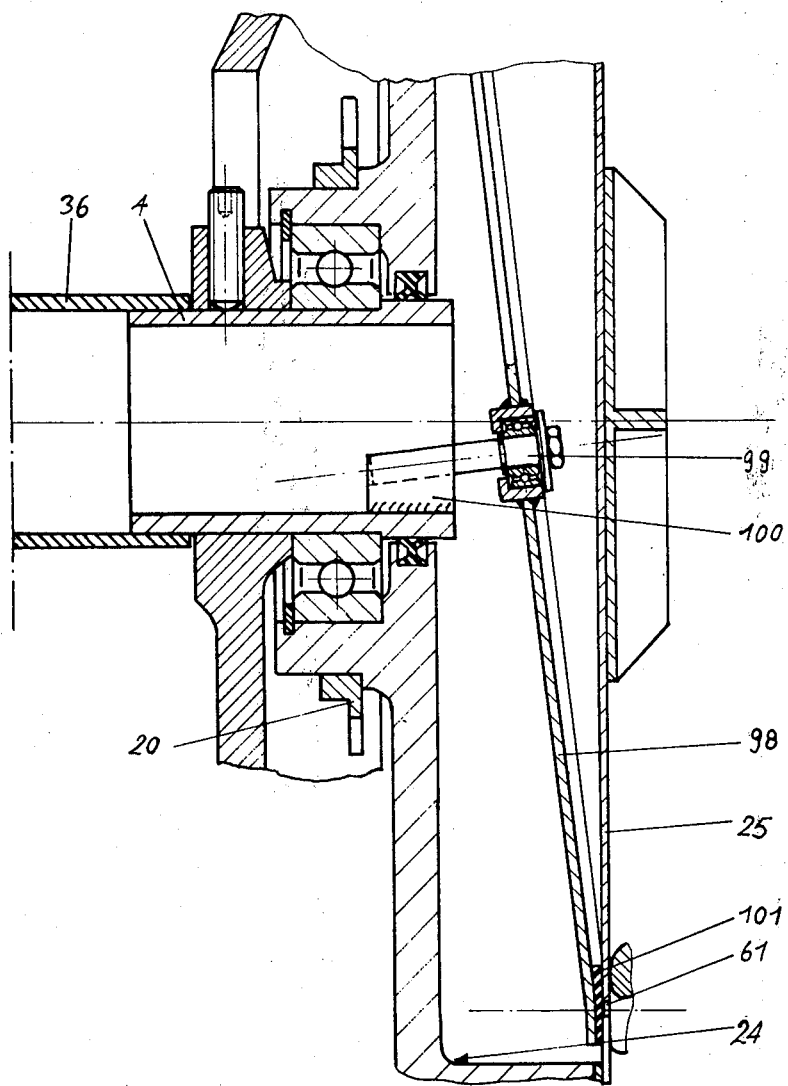

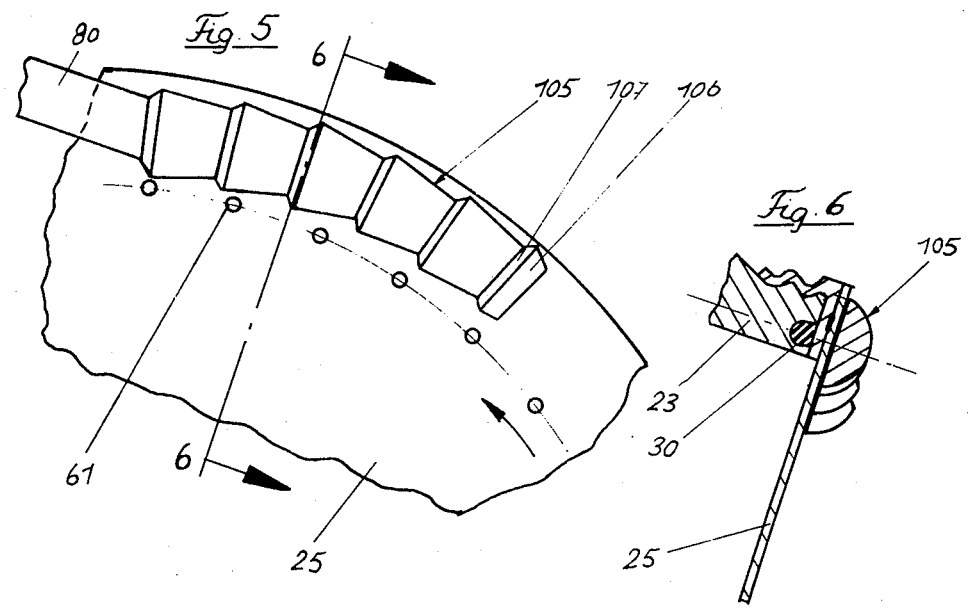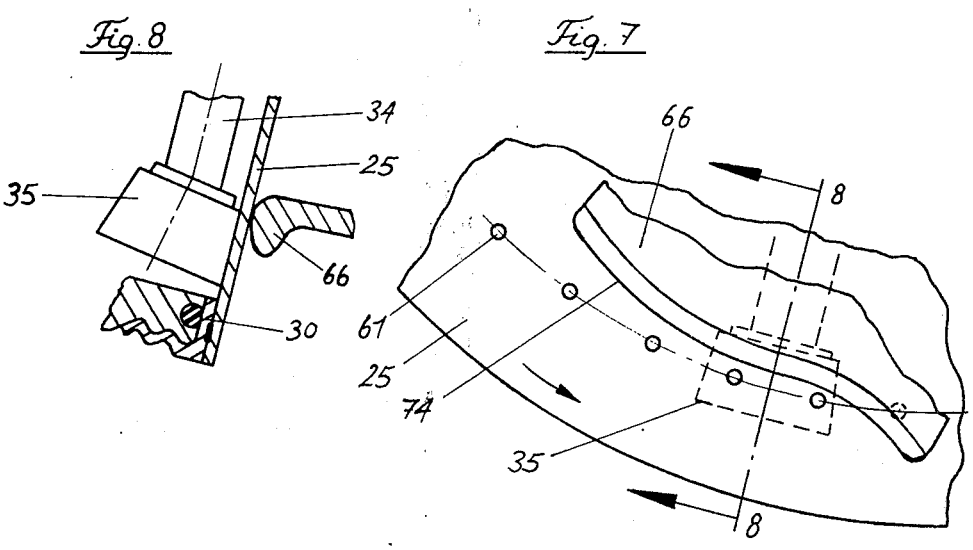

SINGLE SEED DRILLING MACHINE

This is a continuation of application Ser. No. 385,423, filed Aug. 28, 1973, now abandoned.

FIELD OF THE INVENTION

This invention relates to a single seed drilling machine having a drum rotatable about a substantially horizontal axis and disposed partly in or at a seed container, the interior of the drum being connected to a source of negative pressure and the drum having suction holes disposed at equal intervals on a circle.

DESCRIPTION OF THE PRIOR ART

Pneumatically operated single seed drilling machines are known in which individual seeds are held at suction holes by the existence of a pressure differential. For example, a single seed drilling machine is known (German Patent Application No. 1,457,873), in which a drum rotatable about a substantially horizontal axis extends into the seed container and has in its outer surface suction holes disposed equidistantly, each hole having an associated projection being arranged behind said hole in the direction of drum rotation. The space within the drum is connected through the drum spindle to a negative pressure source, so that upon movement of the suction holes through the container, at least one seed is held at each hole and is entrained as the drum rotates. In this known machine, the seeds at the suction holes are singled out by a stream of air directed parallel to the drum axis to blow off the excess seeds. Further, a scraper roll is provided which rotates in the opposite direction to the drum, its shape accommodating the projections on the drum.

Inside the drum is a blower tube which ends at the inside surface of the drum, and which, as the drum rotates, becomes successively aligned with the suction holes. This blower tube is connected to a compressed air source and its effect is that seeds are removed from the holes by the compressed air when a hole moves adjacent the blower tube. Close co-operation between the blower tube and the suction holes is achieved in that the tube is pressed against the inside surface of the drum by a spring.

In this known machine, disadvantages arise in that, in addition to a negative pressure source, it is also necessary to provide a compressed air source. Further, proper function of this machine pre-supposes that the blower tube co-operates at least substantially in sealing fashion with the individual suction holes. By reason of the relative movement between the fixed blower tube and the rotating drum, wear (promoted by dust, treatment medium and seed residues) occurs, so that, in time, it becomes necessary to change the affected parts. Also, this machine can only sow seeds of one size category since a seed larger than the projections is squashed by the scraper roller. If a seed is smaller, then several seeds can easily be allowed through each suction hole by the scraper roller. The stream of air which extends parallel to the drum to single out the seeds may at least partially blow away treatment medium present on the seeds, so that difficulties may arise in growing the sown seeds.

It is thus an object of the invention to reduce or avoid these disadvantages and to provide a relatively simple machine which operates substantially wear-free and at the same time provides for substantially accurate maintenance of the distance required between successive seeds deposited in a row and taken from any uncased, uncalibrated seed stock.

SUMMARY OF THE INVENTION

According to this invention there is provided a seed drilling machine wherein a rotatable plate with inner and outer surfaces closes a space which in use is at reduced pressure so as to hold seeds against the outer surface at suction holes arranged on a circle, and wherein interrupter means in the space engages the inner surface at the circle of holes and ejector means is adjacent the outer surface at the circle of holes and in the region of the interrupter means.

Also according to this invention, in a single seed drilling machine having a seed container, a drum partly in or on the container and rotatable about a generally horizontal axis, means to connect the interior of the drum to a source of negative pressure, and suction holes in the drum and disposed on a circle, there is provided the improvement wherein the suction holes are provided in a perforated plate closing the drum, the plate being accessible to the seeds and being disposed at right angles to the said axis, interrupter means within the drum engaging the inner surface of the plate at the lowest region thereof at the circle of holes, and ejector means engaging the outer surface of the plate at the lowest region thereof at the circle of holes and in the region of the interrupter means.

Thus, in the apparatus of the invention, a negative pressure is in use applied to the interior of the drum, sealing being against the spindle, that is, against the smallest available diameter. Therefore it is not necessary to seal the negative pressure with respect to the ambient pressure at high relative speeds, so that the main cause of wear in the known machines is avoided. Accurate deposition of seeds into the furrow is therefore not left solely to the effect of gravity, but is assured by the interrupter means engaging the inner surface of the perforated plate, in conjunction with the ejector means disposed at the outer surface of the perforated plate in the region of the interrupter means. The perforated plate can be connected to the drum in any desired manner.

Preferably the interrupter means is a roller of elastic material which runs on the inner surface of the perforated plate, in the region of the suction holes. As it runs over the inner surface, the roller can be deformed so that it penetrates partly into the individual suction holes and presses out the seed held on the outer surface of the plate at a hole. In addition to this mechanical effect, there is a sealing of that suction hole which is associated momentarily with the roller with respect to the negative pressure in the drum, so that there is no longer any pressure difference at the relevant seed which might otherwise hold it against the plate at the hole in question.

The roller surface may be frusto-conical and downwardly widening, the axis of the roller in extension passing through the centre of the perforated plate. This arrangement ensures that no relative movement occurs between the roller and the inner surface of the perforated plate, which movement might cause wear on the roller.

The roller may be mounted on an arm connected rigidly to the drum spindle. Alternatively the roller may be mounted on an arm which is pivotably connected to the drum spindle and is engaged by a spring mounted on the spindle, the outer end of which spring urges the arm towards the perforated plate. Both arrangement ensure that the roller is pressed adequately firmly against the perforated plate so that it can partially penetrate the suction holes.

The interrupter means may be a blocking plate the edge of which bears against the inner surface of the perforated plate in the region of the circle of holes, the blocking plate being rotatable about an axis which is slightly inclined to the drum axis and which has only a slightly larger diameter than the circle of holes. This interrupter means engages in the suction holes in the region of the ejection point to some extent and in addition ensures sealing of the relevant suction hole with respect to the negative pressure in the drum.

In many cases, it is advantageous to provide the edge of the blocking plate with a flexible or elastic coating on that side which is towards the perforated plate. The blocking plate or its coating can have projecting studs which, upon rotation of the drum with the blocking plate, engage in the suction holes to a greater or less extent.

The ejector means may have a guide edge which gradually, outwardly draws close to the circle of holes, passes beyond it, and terminates in a downwardly inclined path. This ejector means helps to force the seeds downwards in the ejection region and to impart a desired trajectory to them. The ejector means prevents a seed which has become fouled with the associated suction hole moving beyond the ejection point which would otherwise result in its being deposited in the wrong place.

The guide edge may be rounded at its edge which is close to the outer surface of the perforated plate. This rounding prevents foreign matter, for example hairs, which may be clinging to the seeds, penetrating the gap between the perforated plate and the scraper. At the same time, the rounding ensures that the hairs or other foreign matter cannot advance into the gap between the perforated plate and the ejector means.

The position of the ejector may be adjustable with respect to the circle of holes. This adjustability is important if it is intended to sow different types of seeds which are of considerably differing sizes.

There may be provided a scraper which rests against the outer surface of the perforated plate in the upper region, radially outside the circle of holes, this scraper being profiled step-like, and the effective surfaces of the steps, with increasing distance from the outer surface of the perforated plate being set back farther from the circle of holes. The effect of this arrangement is that in the different steps of the scraper, it is possible to engage beneath the generally more or less spherical seeds, enhancing the effect of the scraper and virtually excluding the possibility of one suction hole holding more than one seed. At the same time, seeds which may be partially introduced into the suction holes cannot be sheared off on the outside of the perforated plate and so destroyed.

The cross-section of the scraper may be the segment of a circle, and the scraper may be of curved construction with a radius of curvature corresponding to the pitch circle radius of the circle of holes. Also in this way it becomes possible to engage beneath the seeds, whereby (in the direction of rotation) the successive steps of the scraper extend increasingly more closely to the circle of holes.

The scraper may have successive pairs of oppositely inclined steps, whereby in the direction of rotation, one step of a pair draws gradually closer to the circle of holes, while the other step in contrast falls back sharply. Therefore, on rotation of the perforated plate, the steps which gradually draw close to the circle of holes press excess seeds gradually and radially inwardly or downwardly, lifting them at least partly off the perforated plate, while the other steps fall back sharply with respect to the circle of holes.

The scraper may be adjustable relative to the perforated plate by being pivotable about an axis parallel to the drum axis. This adjustability is important if it is intended to sow with one machine different types of seeds which are of markedly different sizes.

BRIEF DESCRIPTION OF THE DRAWINGS

FIG. 4 is a section similar to FIG. 3 of a third embodiment which shows a blocking plate;

FIG. 5 is an elevation of part of a scraper co-operating with the perforated plate;

FIG. 6 is a section on the plane 6—6 of FIG. 5;

FIG. 7 is a detail elevation of the ejector co-operating with the perforated plate; and FIG. 8 is a part section on the plane 8—8 of FIG. 7.

DESCRIPTION OF THE PREFERRED EMBODIMENTS

Figure 1:
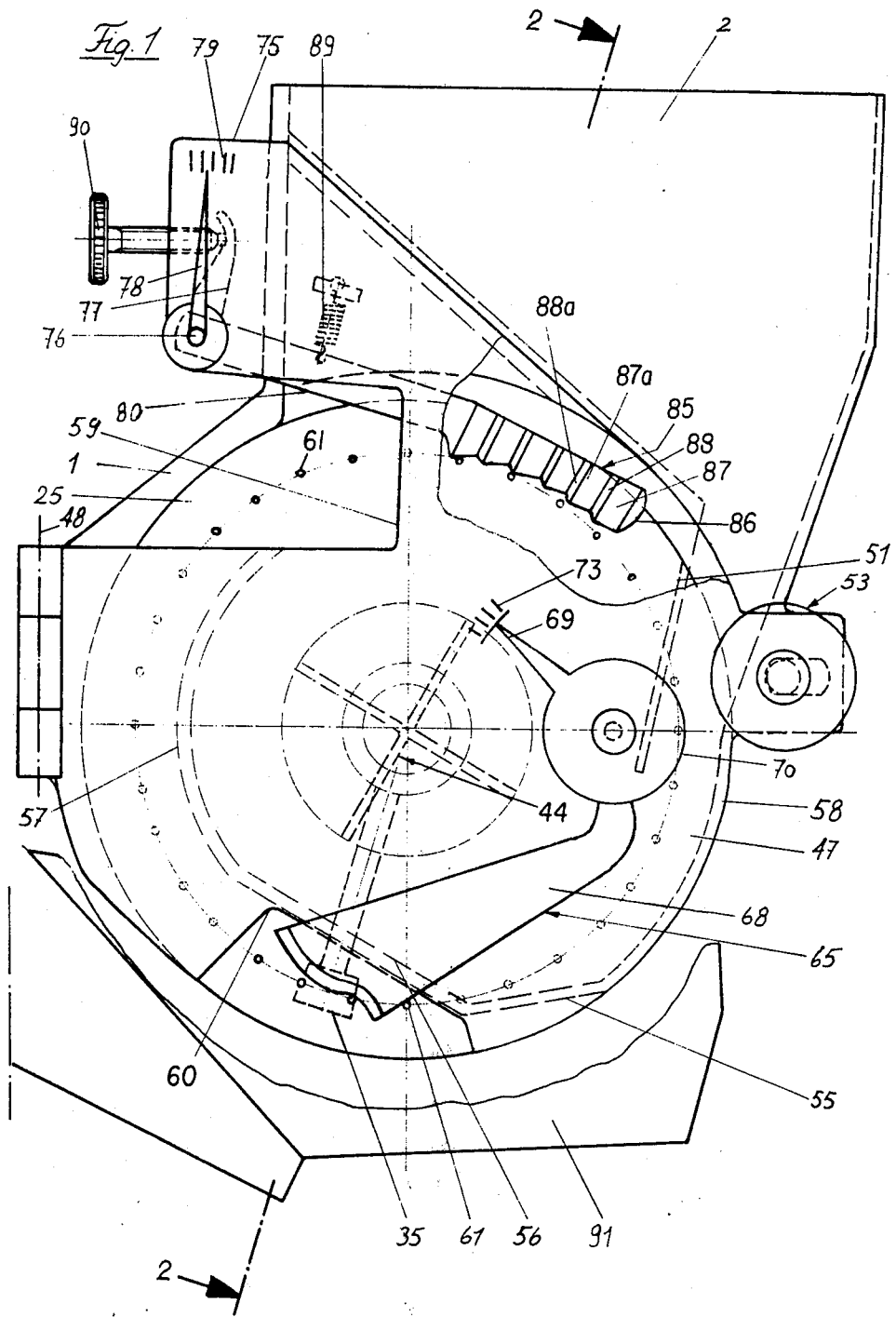
FIG. 1 is a side elevation of a first embodiment of single seed drilling machine, in which the blade is only indicated.
Figure 2:
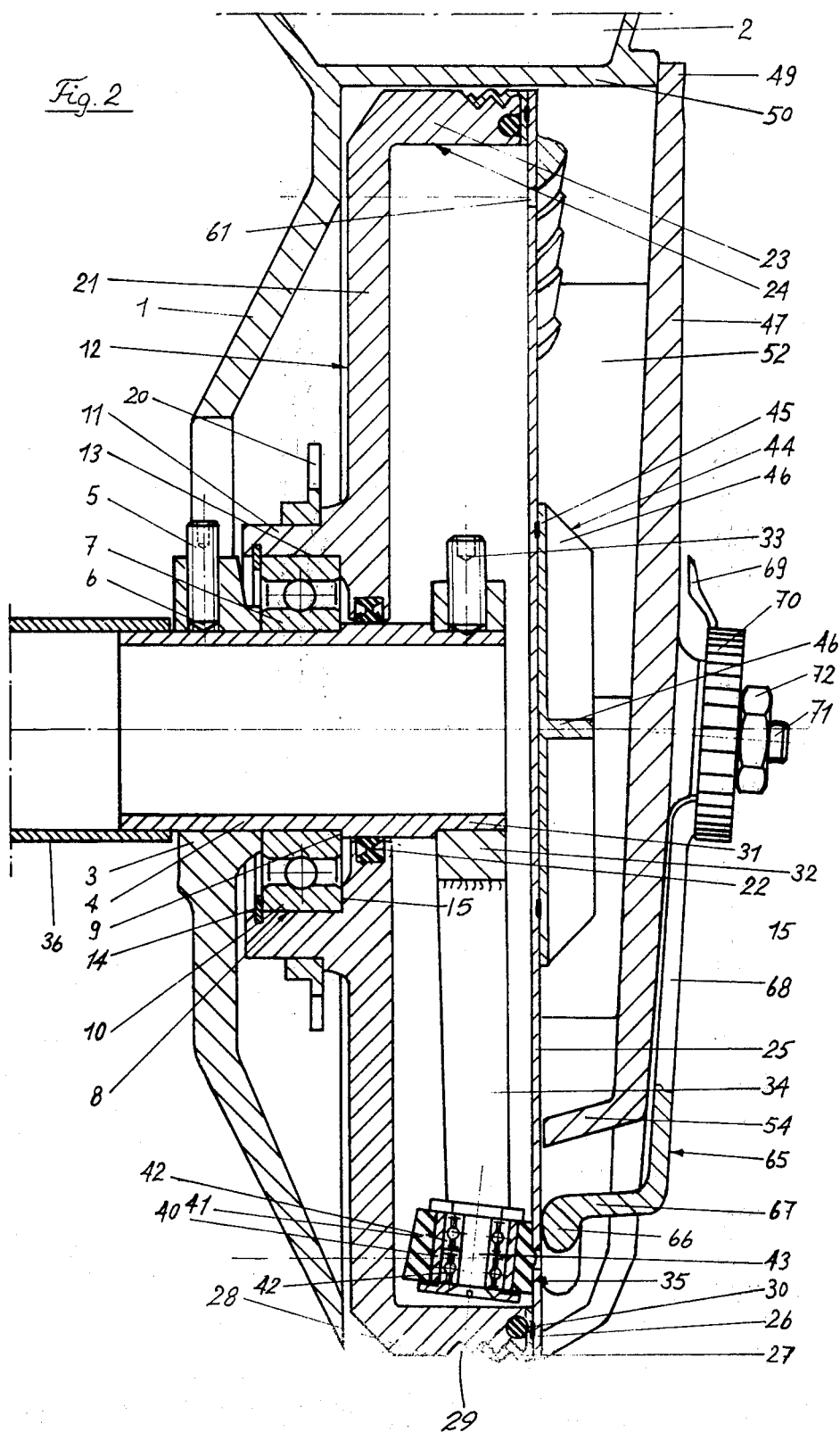
FIG. 2 is a section on the plane 2—2 of FIG. 1.

Referring to FIGS. 1 and 2, the first embodiment of the machine is intended for one seed furrow. A plurality of such single seed machines can be disposed in a row one beside another and may be carried by a tractor.

The single seed drilling machine has a substantially disc-shaped housing 1, formed on the upper portion of which is a seed hopper 2. The housing 1 has a hub part 3 (FIG. 2) in which is a tubular spindle 4. Extending through the hub part 3, and radially with respect to the spindle 4, is a screw 5 which has at its radially inner end a point 6 which engages the spindle 4, fixing the latter to the housing 1. Mounted on the spindle 4 is an inner race 7 of a ball-bearing 8 between the hub part 3 at the housing 1 and a radially outwardly projecting shoulder 9 on the spindle 4. An outer race 10 of the ball-bearing 8 is disposed in an axially extending bearing portion 11 of a cup-like or flanged wheel 12 and is secured in a bore 13 in the bearing portion 11 between a circlip 14 and the bottom 15 of the bore 13.

Mounted rigidly on the bearing portion 11 is a chain wheel 20 which can be driven by a chain (not shown), according to the speed at which the machine is moved.

Connected rigidly to the bearing portion 11 is a disc-shaped portion 21 of the wheel 12, which portion 21 in its radially inward zone extends as far as the spindle 4, where it has a seal 22 which separates the two sides of the disc-shaped portion 21 in air-tight manner at the outer surface of the spindle 4.

The wheel 12 also has a concentrically extending cylindrical portion 23 which, together with the disc-shaped portion 21, forms a drum 24 which is closed by a perforated plate 25 which is parallel to the disc-shaped portion 21. The perforated plate 25 is circular and at its edge 26 is rigidly connected to a threaded projection 27 which co-operates with a screwthread 29 on the outer surface 28 of the cylindrical portion 23, allowing a separable connection to be made between the cylindrical portion 23 and the perforated plate 25. To establish air-tight connection between the plate 25 and the portion 23, a sealing ring 30 is disposed in the edge of the portion 23 which is towards the perforated plate 25, as seen in FIG. 2.

Mounted on the end of the spindle 4 which projects from the housing 1, is a tube 36 which connects the bore in the spindle 4 to a negative pressure source (not shown). The spindle 4 carries at its inner end 31 a collar 32 which is secured on the spindle 4 by a clamping screw 33. Welded to the collar 32 is a radially extending arm 34 which carries a roller 35 at its outer end. The roller 35 includes a cylindrical thrust ring 40 and a soft rubber annular sheel 41 fitted thereon. The ring 40, by means of two dust-proof ball-bearings 42, is rotatable about a journal 43 rigidly connected to the outer end of the arm 34. In extension, the axis of the journal 43 being the axis of the roller 35 passes through the centre of the perforated plate 25. On its outer surface, the rubber shell 41 is frusto-conical such that the extensions of its generatrices also pass through the centre of the plate 25; thus the roller 35 is always in contact with the inside face of the perforated plate 25 along one generatrix.

Fitted centrally on the outside face of the perforated plate 25 is an agitator 44 which consists of a plate 45 resting directly on the outside face of the perforated plate 25 and rigidly connected thereto, as well as two webs 46 extending at right-angles to each other, which cross at the centre of the perforated plate 25 and which slightly project in axial direction from the plate 45.

Provided in the perforated plate 25 on a pitch circle, the diameter of which is a little less than the inside diameter of the cylindrical portion 23, are a number of equidistant cylindrically shaped suction holes 61, their axes in each case being parallel with the spindle 4. The diameter of each suction hole 61 should be such that even the smallest grains of the relevant seed stock cannot pass through it.

A cover 47 is hinged on the housing 1 so that it can pivot about a vertical axis 48 (FIG. 1). The cover 47 is spaced, as shown in FIG. 2, from the perforated plate 25, and downwardly approaches the perforated plate 25. When closed, the cover 47 has its upper edge 49 (FIG. 2) abutting an obliquely extending bottom plate 50 of the seed hopper 2. Connected to the inside surface of the cover 47 is a baffle 51 which constitutes a transition from the seed hopper 2 to a seed container 52 formed between the cover 47 and the perforated plate 25. At its end remote from the vertical axis 48, the cover 47 can be separably connected to the housing 1 by a pivoting connection 53, shown diagrammatically in FIG. 1.

On the inside of the cover 47 is a wall 54 which extends so close to the outside of the perforated plate 25 that, when the cover 47 is closed, it seals off the lower portion of the seed container 52 and reliably prevents seeds dropping from the container 52. As FIG. 1 shows, in the bottom part of the cover 47, starting from the right-hand edge of the cover in FIG. 1, the wall 54 has an almost horizontal portion 55 adjacent which, to the left, is a rising, obliquely extending portion 56 which merges into an arcuately extending portion 57. Adjacent to the right-hand end (FIG. 1) of the horizontal portion 55 is a marginal portion 58 extending close to the outside of the perforated plate 25 and, when the cover 47 is closed, adjacent the seed hopper 2 in the region of the pivoting connection 53. The seed container 52 formed by the cover 47 is thus defined by the marginal portion 58, the horizontal portion 55, the obliquely extending portion 56 and the arcuately extending portion 57. The right-hand upper part of the seed container 52 is open and a rectangular cut-out 59 (FIG. 1) in the cover 47 permits inspection of the perforated plate 25.

In its lower part, the cover 47 extends as far as the obliquely extending portion 56 of the wall 54 and forms a recess 60 where the perforated plate 25 is exposed. In this recess a rectangularly angled ejector (generally indicated by 65) engages the outside face of the perforated plate 25 and has, extending parallel with the plate 25, a guide portion 66, the bottom end of which is rounded off, FIG. 2. Adjacent the upper end of this guide portion 66, and virtually at right-angles to the perforated plate 25, is a connecting portion 67 which merges into an arm portion 68 extending on the outside of the cover 47. The arm portion 68 is connected to a knurled disc 70 having a pointer 69. This disc and pointer are turnable on a bolt 71 projecting outwardly from the cover 47 (FIG. 2) and which can be tightened in the desired position by a nut 72 on the bolt 71. The pointer 69 co-operates with a dial 73 on the cover 47.

Referring now to FIGS. 7 and 8, the guide portion 66 of the ejector 65 is shown on a larger scale than in FIG. 1, and forms a guide edge or path 74. Viewed in the direction of rotation of the perforated plate 25, this guide path 74 is composed of two portions of opposite curvature, the seed entrained by the perforated plate 25 reaching a first portion which has a curvature corresponding approximately to the curvature of the circle of holes 61, while the second portion which it reaches subsequently is curved arcuately downwardly, passing beyond the circle of holes and extending as a parabola. The roller 35 is disposed on the inside of the perforated plate 25 in the region of this guide path 74.

Referring again to FIG. 1, the cover 47 has a projection 75 at the top, extending to the left. Mounted in this projection 75 is a shaft 76 on which in the projection 75 a thrust lever 77 is fixedly secured. Rigidly connected to the shaft 76 is a pointer 78 which co-operates with a dial 79 on the outside of the projection 75. The shaft 76 also carries a positioning lever 80 on the end of which is a scraper 85 having a plane surface 86 which, when the cover 47 is closed, lies closely against the outside of the perforated plate 25, radially outside the holes 61. The scraper 85 has a step-like profile, as shown, adjacent steps being of opposite pitch. For example, the step 87 (first reached by a seed held on the perforated plate 25) gradually approaches the circle of holes, while the subsequent step 88 in contrast falls back sharply. The next step 87a again gradually approaches the circle of holes, extending more closely to the circle than the step 87. Then follows step 88a, which again falls back steeply. The situation is similar with the subsequent steps, although in the direction of rotation the steps 87 always extend closer to the circle of holes.

Those surfaces of the steps 87, 88 which are towards the circle of holes are such that, with increasing distance from the outside of the perforated plate 25, they recede increasingly further from the circle of holes. In consequence, the steps 87, 88 adjacent the outside of the plate 25 project farthest in the direction of the circle of holes and consequently engage beneath the seeds held on the plate 25.

Mounted on the projection 75 of the cover 47 is one end of a tension coil spring 89, the other end being connected to the positioning lever 80 to urge the lever 80 (FIG. 1) to turn anti-clockwise about the shaft 76. The axis of the spring 89 lies in a plane inclined to the perforated plate 25, so that the upper end of the spring 89 is farther behind the projection 75 than is its lower end. Thus the lever 80 and the scraper 85 are urged not only upwardly but also towards the plate 25.

Also on the projection 75 is a knurled screw 90 of which the end screwed into the projection 75 engages the thrust lever 77 and, upon screwing of the knurled screw 90 into the projection 75, pivots the thrust lever 77 and with it the scraper 85 clockwise against the action of the spring 89.

FIG. 1 shows a blade 91 needed for producing the furrow in which the seeds are to be sown.

Figure 3:
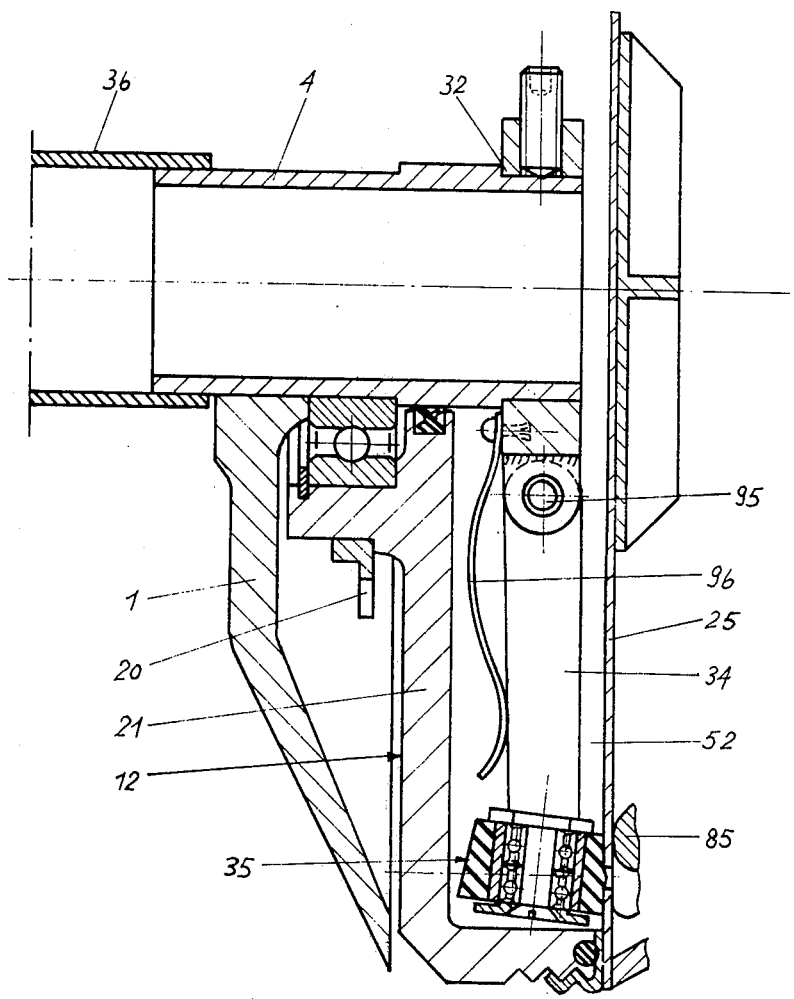
FIG. 3 is a section similar to FIG. 2, of a second embodiment in which substantially only the pivotable connection between the arm carrying the roller and the drum spindle is shown.

The second embodiment (FIG. 3) differs from the first only in that the arm 34 carrying the roller 35 is not rigidly connected to the spindle 4 but is pivotable about a pin 95 mounted transversely of the spindle 4 and held by the collar 32. Close to its outer end, that side of the arm 34 which is towards the disc-shaped portion 21 is engaged by a leaf spring 96, the inner end of which is fixed to the collar 32.

The third embodiment (FIG. 4) differs from the other embodiments only in the construction of the interrupter element, which is in this case in the form of a blocking plate 98. This blocking plate 98 is rotatable about a disc axis 99 slightly inclined to the drum axis 4, and which is welded to the spindle 4 by a holder 100. The inclination of the disc axis 99 is such that the edge of the blocking plate 98, in the region of the holes 61, engages the lower portion of the drum 24 on the inside of the perforated plate 25. The diameter of the blocking plate 98 is therefore only slightly greater than the diameter of the circle of holes 61, so that there are virtually no relative movements between the perforated plate 25 and the blocking plate 98.

The edge of that side of the blocking plate 98 which is close to the perforated plate 25 has an elastic covering 101 which seals the relevant suction hole 61 with respect to the negative pressure in the drum 24, and also penetrates partially into the suction hole 61 and expresses the seed mechanically from it.

FIGS. 5 and 6 show another embodiment of scraper 105. In cross-section (FIG. 6) the scraper 105 is a segment of a circle and has a radius of curvature (FIG. 5) corresponding approximately to the pitch circle radius of the perforated plate 25. It has successive pairs of oppositely inclined steps 106, 107, the step 106 reached in the direction of rotation (to the left in FIG. 5) of the perforated plate 25 extending gradually closer to the circle of holes, while the next step 107 falls back sharply, as shown. The following pairs of steps are similarly arranged. As can be seen from FIG. 6, the scraper 105, in the immediate vicinity of the perforated plate 25, projects to the greatest extent towards the circle of holes and can thus engage beneath seeds at the holes 61.

OPERATION

Seed passes into the seed container 52 from the hopper 2. If the drum 24 is connected to a negative pressure source (not shown) and if the chain wheel 20 is driven according to the speed at which the machine is advanced over the ground, then seeds are applied against the suction holes 61 in the plate 25 and, as the plate rotates, they are entrained by the holes, and in some cases more than one seed may cling to each hole 61. Those suction holes 61 which carry seeds now pass into the zone of influence of the scraper 85 or 105, whose position can be adjusted by the knurled wheel 90 so that only one seed is allowed to remain at each suction hole 61, the diameter of the holes being of course less than the diameter of the smallest seed. The thus singled out seeds are now moved on until their radilly inward sides are each engaged by the guide path 74 of the ejector 65, so that the seeds are pressed gradually, radially outwards. This action is assisted in that as a rule during the action of the ejector 65 on a seed, the associated suction hole 61 is masked on the inside of the perforated plate 25 by the interrupter element, e.g. the roller 35 or the blocking plate 98, so that the seed is no longer held by the negative pressure in the drum 24. Further, the interrupter element partly projects into the relevant hole 61 so as to express the seed which is partly inserted held in the hole 61. The trajectory of deposition of the seed into the furrow is determined, independently of the weight of the seed and the peripheral speed of the perforated plate 25, by the guide path 74. Delayed deposition of seed is not possible, so that the distance between the adjacent sown seeds is generally constant.

If it is intended to use the machine for different seed in which the individual seeds are of dimensions other than those previously used, then after the cover 47 has been opened, the perforated plate 25 can be exchanged for a different plate 25 having appropriate sized holes 61; the scraper and the ejector element are adjusted appropriately.

What I claim is:

1. In a single seed drilling machine having a seed container, a drum comprising a cup-like portion and a perforated plate attached to and enclosing said cup-like portion partly in or at the container and rotatable about a generally horizontal axis, means to connect the interior of the drum to a source of negative pressure, and suction holes in the drum and disposed on a circle, the improvement wherein the suction holes are provided in said perforated plate of the drum, the plate being accessible to the seeds and being disposed at right angles to said axis, interrupter means within the drum engaging the inner surface of the plate at the lowest region thereof at the circle of holes, and ejector means engaging the outer surface of the plate at the lowest region thereof at the circle of holes and acting substantially simultaneously with the interrupter means.

2. A machine according to claim 1, wherein the position of the ejector means is adjustable with respect to the circle of holes.

3. A machine according to claim 2, wherein the interrupter means includes a roller of elastic material positioned to roll on the inner surface of the perforated plate, said roller being of frusto-conical shape and its axis in extension, passing through the center of the perforated plate.

4. A machine according to claim 3, wherein the roller is mounted on an arm pivotally connected to a spindle mounting the drum, which arm is engaged by a spring mounted on the spindle, the radially outer end of the spring urging the arm towards the plate.

5. A machine according to claim 1, wherein the interrupter means includes a blocking plate the rim of which bears against the inner surface of the perforated plate in the region of the circle of holes and which blocking plate is rotatable about an axis slightly inclined to the drum axis and which blocking plate is slightly larger in diameter than the circle of holes.

6. A machine according to claim 5, wherein the rim of the blocking plate has a flexible covering on its side adjacent the perforated plate.

7. A machine according to claim 1, wherein the ejector means has a guide edge which gradually, outwardly approaches the circle of holes, passes beyond the circle of holes, and terminates at a downwardly inclined edge portion.

8. A machine according to claim 7, wherein the guide edge is rounded at its side adjacent the outer surface of the perforated plate.

9. A machine according to claim 1 wherein scraper means rests against the outer surface of the perforated plate in an upper zone thereof radially outside the circle of holes, the scraper means being of stepped shape, the operative surfaces of the steps, with increasing distance from the outside of the perforated plate, extending back farther from the circle of holes.

10. A machine according to claim 9, wherein the scraper means constitutes in cross-section a segment of a circle, and is of curved shape with a radius approximately corresponding to the radius of the circle of holes.

11. A machine according to claim 9, wherein the scraper means has successive pairs of oppositely-inclined steps, one step of each pair in a peripheral direction extending gradually closer to the circle of holes and the other step of each pair extending sharply back from the circle of holes.

12. A machine according to claim 9, wherein the scraper means is pivotally adjustable about an axis parallel to the drum axis.

* * * * *